United States Patent [19]

Abatzoglou

[11] Patent Number: 5,376,940
[45] Date of Patent: Dec. 27, 1994

[54] HELICOPTER RECOGNITION RADAR PROCESSOR

[75] Inventor: Theagenis J. Abatzoglou, Fullerton, Calif.

[73] Assignee: Hughes Aircraft Company, Los Angeles, Calif.

[21] Appl. No.: 811,599

[22] Filed: Dec. 19, 1985

[51] Int. Cl.⁵ .................... G01S 7/292; G01S 13/52
[52] U.S. Cl. ........................ 342/192; 342/193; 342/90; 342/99; 342/101
[58] Field of Search ............ 342/192, 193, 90, 99, 342/101, 195

[56] References Cited

U.S. PATENT DOCUMENTS

| | | | |
|---|---|---|---|
| 3,798,642 | 3/1974 | Augenblick et al. | 342/193 X |
| 3,898,654 | 8/1975 | Vehrs, Jr. | 342/94 |
| 3,983,558 | 9/1976 | Rittenbach | 342/160 |
| 4,038,656 | 7/1977 | Webb, Jr. et al. | 342/192 |
| 4,217,585 | 8/1980 | Fishbein et al. | 342/193 X |
| 4,233,605 | 11/1980 | Coleman | 342/6 |
| 4,275,396 | 6/1981 | Jacomini | 342/93 |
| 4,346,382 | 8/1982 | Bosc et al. | 342/192 |
| 4,348,674 | 9/1982 | Muth et al. | 342/192 |
| 4,370,654 | 1/1983 | Krutsch | 342/6 |
| 4,389,647 | 6/1983 | Fanuele et al. | 342/192 |
| 4,483,017 | 11/1984 | Hampel et al. | 342/192 X |
| 4,555,705 | 11/1985 | Bossennec et al. | 342/192 |
| 4,949,091 | 8/1990 | Moulin et al. | 342/192 |

Primary Examiner—John B. Sotomayor
Attorney, Agent, or Firm—W. K. Denson-Low

[57] ABSTRACT

A radar processor is disclosed for processing the radar return samples from a Doppler radar receiver to discriminate helicopter targets from fixed-wing targets. The samples are passed through a helicopter filter which eliminates the target skin Doppler return, and passed the sidebands about the target skin return which are due to the helicopter rotor hub modulation. The coefficients of the helicopter filter are selected to maximize the signal-to-noise ratio. The radar processor requires only a few milliseconds on target for reliable detection and can, therefore, be easily implemented by scanning surveillance systems.

4 Claims, 5 Drawing Sheets

HELICOPTER RECOGNITION RADAR PROCESSOR

BACKGROUND OF THE INVENTION

The invention relates to Doppler radar, and more specifically to an improved radar signal processing system for discriminating between different aircraft types and ground clutter to identify helicopters.

For certain radar applications, it would be advantageous to be able to identify those targets which represent helicopters. U.S. Pat. No. 4,389,647 discloses a radar system directed to provide this capability. As understood however, the system disclosed in this patent would not operate as well for low Doppler (i.e., low velocity) helicopters, is not readily applicable to scanning radar systems, and requires relatively long acquisition times to identify a helicopter target.

U.S. Pat. Nos. 4,346,382 and 4,275,396 describe radar systems for detecting helicopters. As understood by applicant, in each of these systems the helicopter detection is accomplished by detecting the modulation induced on the radar return signal by the rotor blades, i.e., detecting the rotor blade flashes. This implies that the required time on target is relatively long, which may prevent use in a scanning surveillance system.

It would therefore represent an advance in the art to provide a radar capable of recognizing helicopter targets within a relatively short acquisition time and which is operable for low Doppler helicopters.

It would further be advantageous to provide a scanning surveillance radar capable of recognizing helicopter targets.

SUMMARY OF THE INVENTION

A Doppler radar system or recognizing helicopter targets from fixed-wing targets is disclosed. The system comprises a radar receiver responsive to radar return signals for providing receiver output signals, and Doppler filter and detection elements or filtering and detecting the receiver output signals to provide target Doppler signals. The system further includes a radar processor responsive to the receiver output signals and the target Doppler signals for providing an indication of the "helicopter present" state. The processor includes helicopter detection means responsive to the spectral components of the output signal resulting from modulation resulting from the helicopter rotor hub of a helicopter in the region illuminated by the radar system. This helicopter detection means comprises a digital filter which rejects the target skin Doppler return, and passes the energy in sidebands about the target skin return which are due to the helicopter rotor hub modulation. The coefficients of the digital filter are selected so as to maximize the filter output signal-to-noise ratio. In one embodiment for operation in a simple noise environment containing only ground clutter and thermal noise, the filter coefficients are selected in accordance with the target skin Doppler return. In a second embodiment for operation in an arbitrary noise environment, the filter coefficients are calculated adaptively, based on estimates of the noise and the target skin return. The radar processor further includes a comparator or comparing the magnitude of the digital filter output against a helicopter detection threshold to determine the "helicopter present" condition. The radar processor typically requires only a few milliseconds on target and can, therefore, be readily implemented into scanning surveillance systems.

BRIEF DESCRIPTION OF THE DRAWINGS

These and other features and advantages of the present invention will become more apparent from the following detailed description of exemplary embodiments thereof, as illustrated in the accompanying drawings, in which.

DETAILED DESCRIPTION

Figure 1:
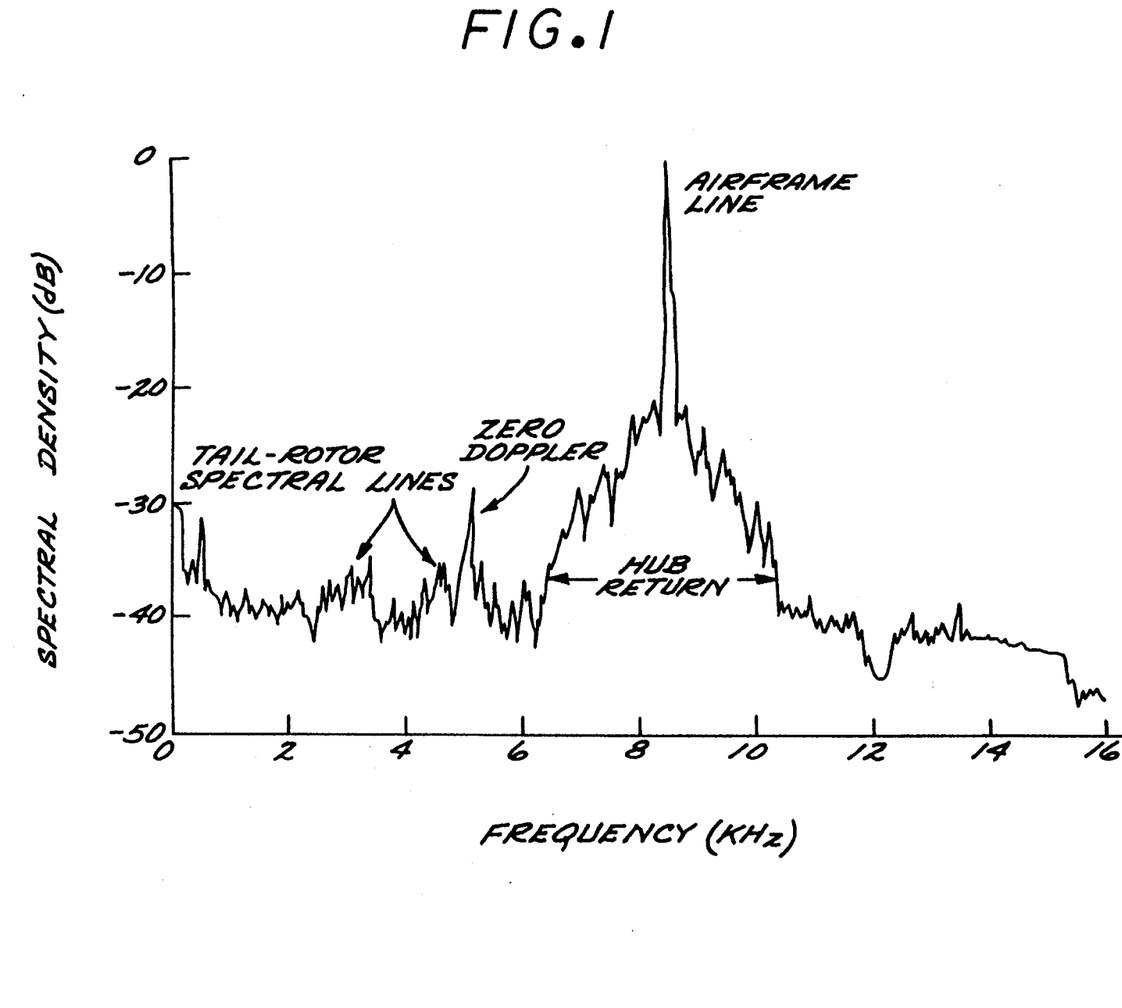
FIG. 1 is a plot illustrative of the power spectral density of a typical helicopter return signal.
Figure 2:
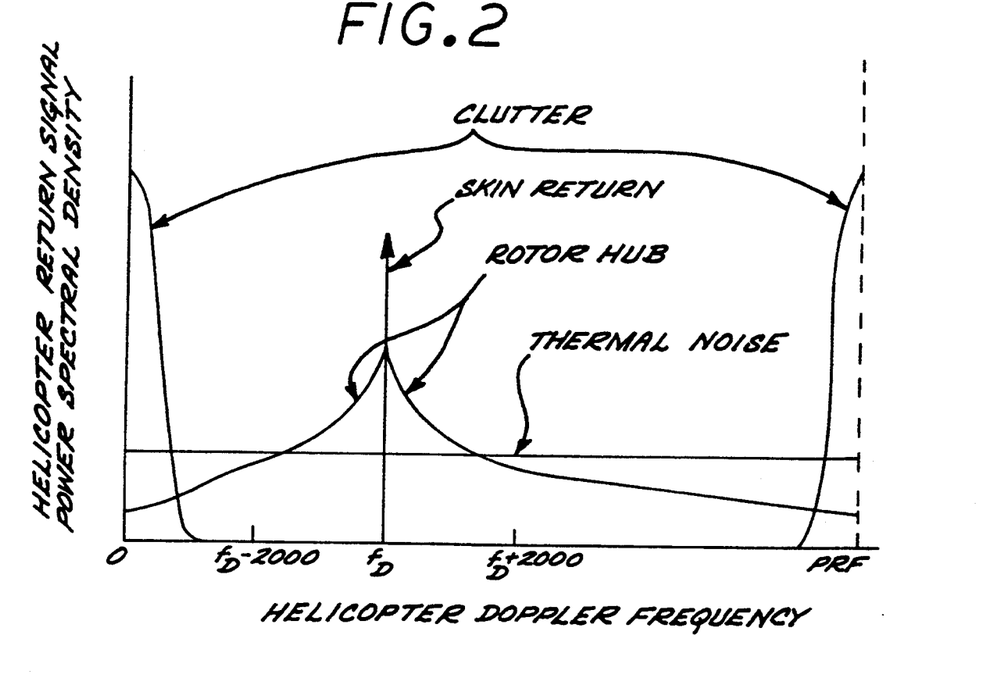
FIG. 2 is a plot of the helicopter signal power spectral density as a function of the helicopter Doppler frequency.

The invention comprises a radar processor for helicopter/fixed wing target classification, and relies on the spectral signature of the helicopter rotor hub, which has a higher probability of occurrence than the blade flash. The spectral density of a typical helicopter radar return as a function of return frequency and the helicopter Doppler frequency, respectively, is illustrated in FIGS. 1 and 2. The helicopter skin return peaks at Doppler frequency $f_D$, with the rotor hub return comprising sidebands about $f_D$. The ground clutter peaks at sidebands well away from $f_D$. The thermal noise is shown in FIG. 2 as a constant value.

The invention exploits the fact that the helicopter rotor hub reflects a considerable amount of the electromagnetic energy with which it is illuminated by the radar system. FIG. 1 depicts the spectral density of a typical radar return signal from a helicopter. The total power reflected from the rotor hub is typically within 5 to 10dB of the power reflected by the helicopter skin. In contrast, the power reflected by the rotor blades is typically less than 1% of the total reflected power. Moreover, typically 50% of the rotor hub return is spectrally located within 300 Hz of the skin return Doppler frequency, and 99% is contained within the 2000 Hz band centered at the target skin return Doppler frequency. The zero doppler frequency has been translated for visibility purposes.

SIGNAL MODELS

Consider complex-valued baseband samples $x_n$ ($=I+jQ$) of a radar return signal collected from a target, which may be either a fixed-wing target or a helicopter. For the "fixed wing" target hypothesis, these samples can be modeled as $$x_n = z_n e^{2\pi j n T f_D} + V_n + c_n \quad (1)$$

For the "helicopter" target hypothesis, the samples $X_n$ may be modeled as:

$$x_n = h_n + z_n e^{2\pi j n T f_D} + c_n + v_n \quad (2)$$

where $h_n$ represents the rotor hub and blades return samples, the expression $$z_n e^{2\pi j n T f_D}$$

represents the helicopter skin return samples, $c_n$ represents the clutter return samples, $v_n$ represents the thermal noise, $f_D$ represents the target Doppler frequency samples, and T represents the inter-pulse period (IPP) for the radar.

The clutter return samples and the return samples from the helicopter rotor hub are modeled as zero mean, complex gaussian stochastic sequences of known power spectra. The helicopter skin return samples are molded as a zero mean complex gaussian stochastic sequences with a narrow power spectrum. It is also assumed that the stochastic sequences $c_n$, $h_n$, $z_n$ and $v_n$ and independent from each other and wide sense stationary.

The autocorrelation matrix $Q_{s+n}$ (where k is a particular row and l is a particular column) of the return signal plus noise is defined by Equation 3:

$$(Q_{s+n})_{k,l} = R_h(k-l) + (e^{2\pi j(k-l)T f_D}) R_Z(k-l) + (N_0/2)\delta_{kl} + R_c(k-l) \quad (3)$$

and the autocorrelation matrix $Q_n$ of the noise is defined by Equation 4, $$(Q_n)_{k,l} = (Q_{s+n})_{k,l} - R_h(k-l) \quad (4)$$

where:
  $R_h$ is the rotor hub autocorrelation sequence;
  $R_Z$ is the target skin (Doppler=0) autocorrelation sequence;
  $R_c$ is the ground clutter autocorrelation sequence;
  $N_0/2$ is the power of white noise; and
  $\delta_{kl}$ is unity if k equals l, and zero if k does not equal l.
The rotor power spectrum is modeled as $$S_H(f) = C(10^{-(A/10)|f-f_d|}) \quad (5)$$

where $A = 0.006$ and C is a constant chosen so that the rotor hub power is equal to $$(1/10)(\text{SKINPOWER})_{pulse} \quad (6)$$

The target skin power spectrum is modeled as a rectangle centered about Doppler frequency $f = f_D$ of total width about 1/25 PRF (pulse repetition frequency). The ground clutter is assumed to have a gaussian shape power spectrum with a standard deviation of about 20 Hz at X-band.

Helicopter Detection-Signal Processing

The invention exploits the rotor hub return characteristics in the following manner. The "signal" is declared to consist of the hub and rotor blades return $h_n$ only. The "noise" is considered to be the aggregate of the skin return, the clutter return and the thermal noise.

The samples $x_n$ are processed through a helicopter filter by multiplication with filter coefficients or weights $w_n$ and then summing the respective weighted samples. The coefficients of the helicopter filter are selected so as to maximize the filter output signal to noise ratio (SNR), defined by Equation 7, $$SNR = E\{|W^* \cdot H|^2\} / E\{|W^* \cdot U|^2\} \quad (7)$$

where:
  $H = (h_l, \ldots, H_n)^T$, the rotor hub return vector;
  $U = (u_l, \ldots, u_n)^T$, the noise return vector, where
  $u_n = z_n e^{2\pi j n T f_D} + v_n + c_n$; and
  $W = (w_l, \ldots, w_n)^T$, the helicopter filter coefficients.

The SNR relationship defined by Equation 7 has the following conjugate symmetric quadratic form in W.

$$SNR(W) = (W^* Q_s W) / (W^* Q_n W) \quad (8)$$

The maximum SNR (W) is obtained for the vector $W_{max}$, where $W_{max}$ is the eigenvector of $Q_n^{-1} Q_s$, which corresponds to its largest eigenvalue. $Q_n$ is the noise autocorrelation matrix and $Q_s = R_h$ is the signal autocorrelation matrix. The largest eigenvalue of $Q^{-1} Q_s$ may be shown to be equal to SNR ($W_{max}$).

The vector $W_{max}$ is obtained by maximizing Equation 8 with respect to the filter coefficient vector W. This maximization is obtained by taking the partial derivative of SNR with respect to W and solving the resultant expression for the case when the partial derivative is set to zero, as in Equation 9.

$$\frac{\partial SNR}{\partial W} = (W^* Q_s)/(W^* Q_n W) - (W^* Q_s W)(W^* Q_n)/(W^* Q_n W)^2 = 0 \quad (9)$$

Transposition of the relationship of Equation 9 leads to the following solution for $W_{max}$.

$$W_{max} = (W^* Q_s W)(Q_n^{-1} Q_s W)/(W^* Q_n W) \quad (10)$$

Thus, the maximum eigenvalue of $Q_n^{-1} Q_s$ gives the desired solution for $W_{max}$. These weights depend inter alia on the target's skin Doppler return.

It can be shown that the performance of an algorithm of the form $$|X^* \cdot W| \underset{H_0}{\overset{H_1}{\gtrless}} \text{Threshold} \quad (11)$$

can be expressed by the receiver operating characteristic (ROC) of Equation 12.

$$P_D = P_{FA}^{1/(SNR+1)} \quad (12)$$

where $P_D$ represents the probability of (helicopter) detection, and $P_{FA}$ represents probability of false alarm.

Figure 3:
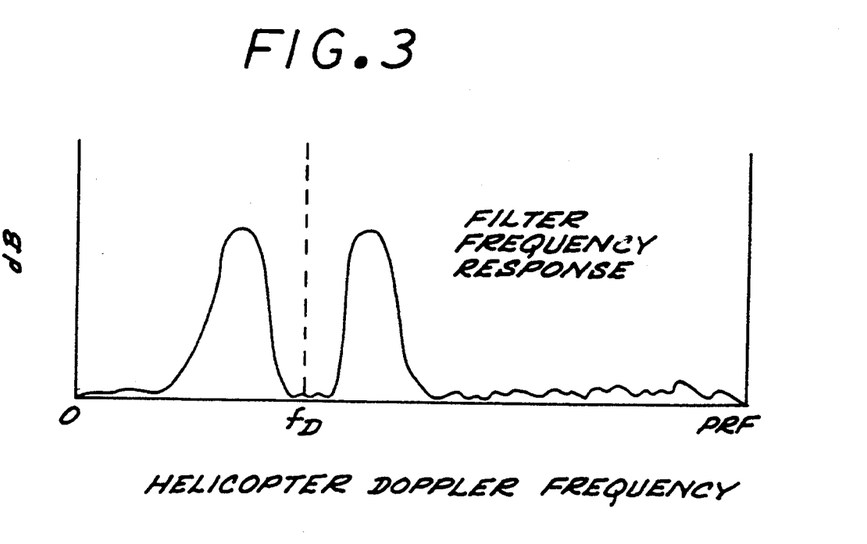
FIG. 3 is a plot of radar skin return power as a function of normalized frequency, illustrating an optimal helicopter filter response, with the filter designed to pass the power reflected from the rotor hub and to reject the helicopter skin return and ground clutter.

The effect of the helicopter filter processing is to eliminate the "noise" part of the return signal, i.e., the target skin return, clutter return and thermal noise, and to enhance the "signal" component, i.e., the hub and the rotor blades return which is characteristic in helicopters. This is illustrated by the exemplary helicopter filter response characteristic shown in FIG. 3. Therefore, if a fixed-wing object is present, the output of the filter processing will be small; if a helicopter is present, the output will be relatively large.

The set of coefficients $w_n$ depends in general on the target Doppler $f_D$, the power spectrum of the clutter present and the power spectral density of other noise and interference sources, such as thermal noise and chaff. If it is surmised that only ground clutter and thermal noise are present along with the target return, then the set of filter coefficients can be selected on the basis of the target Doppler only, as will be described with reference to the processor embodiment of FIG. 4. Otherwise, for the general noise environment, wherein the noise present may include rain clutter, moving clutter and chaff, the noise and clutter correlation matrix is computed adaptively using Burg's Maximum Entropy algorithm, as will be described with reference to the processor embodiment of FIG. 5.

After the signal samples are multiplied by the filter coefficients and summed, the output is tested against a threshold value. If the output exceeds the threshold value, a "helicopter present" condition is declared present; otherwise a "helicopter absent" condition is assumed.

The threshold value used in a particular application depends on the receiver operating characteristic ROC selected by the user, a function of the signal-to-noise ratio and the probability of detection $P_D$ and/or the probability of false alarm $P_{FA}$ selected by the user. For the disclosed embodiment, Equation 13 may be employed to calculate a suitable threshold value $$\text{Threshold} = \left( \left( -\ln P_{FA} \right) \sum_{n=1}^{N} |w_n|^2 \right)^{\frac{1}{2}} \sigma \quad (13)$$

where $\sigma$ represents the standard deviation of the thermal noise sample.

Figure 4:
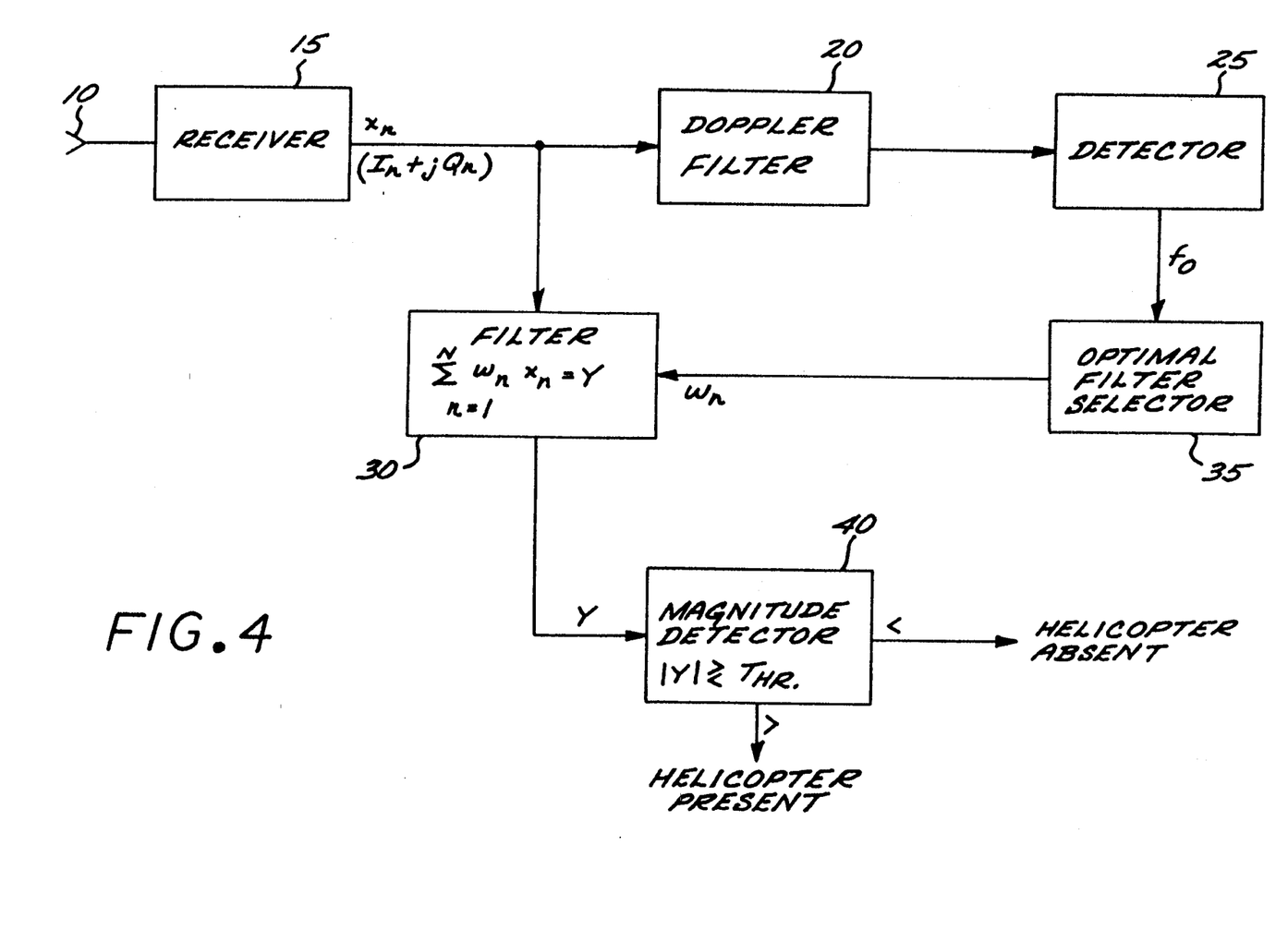
FIG. 4 is a block diagram of a radar processor employing the invention for the case when the noise component of the return signal is assumed to comprise only ground clutter and thermal noise.

Referring now to FIG. 4, a block diagram of one embodiment of a radar processor implementing the invention is disclosed. For this embodiment, the "noise" component of the radar return $x_n$ are presumed to comprise only the target skin return, ground clutter and thermal noise. Thus, the noise model assumes a simplistic noise environment which does not include rain or moving clutter or chaff. The spectral components of the ground clutter are typically at sidebands greater than 2000 Hz about the skin Doppler $F_D$ (see FIG. 2), while virtually all the energy reflected from the rotor hub is contained within the 2000 Hz band centered at the skin Doppler return. Hence, the helicopter filter may be designed to reject all energy outside this 2000 Hz band and will, therefore, reject the ground clutter. The thermal noise may be assumed to have a constant spectral power density within the band passed by the helicopter. Thus, the only variable in the "noise" component is the target skin return.

The processor comprises the radar receiver 15 which receives the radar return signals from antenna 10. The receiver 15 provides the complex-valued baseband samples $x_n$ of the radar return signal.

The samples $x_n$ are filtered by the Doppler filter 20 and then detected at detector 25 to provide the target Doppler frequency samples $f_D$. Receiver 15, Doppler filter 20 and detector 25 represent conventional devices employed in Doppler radar systems whose functions are well known to those skilled in the art, and need not be described in further detail.

In accordance with the invention, the target Doppler frequency samples $f_D$ are provided as an input to the optimal filter selector 35, which employs the target Doppler $f_D$ to determine the optimal filter coefficients $w_n$. The selector 35 provides the selected filter coefficients $w_n$ to the helicopter filter 30.

The filter coefficients of the set of filters corresponding to a predetermined set of Doppler frequencies $f_D$ are precomputed and stored in memory with the radar processor. This substantially minimizes the computational burden on the radar processor, since the filter coefficients need not be computed on a real-time basis. Instead, the Doppler $f_D$ may be employed as a look-up table pointer to address the appropriate memory locations in which the filter coefficients defining the filter corresponding to the Doppler $f_D$ are stored.

By way of example, in one particular application, 29 Doppler values $f_D$ covering the expected Doppler shift frequency range were selected. In that application, the number of radar samples collected per interval is 14 and, therefore, each filter $w_n$ is characterized by 14 cofficients $w_1 w_2, \ldots, w_{14}$. The actual filter coefficients for each filter are calculated in accordance with the discussion hereinabove with respect to Equations 9 and 10. The particular noise autocorrelation matrix $Q_n$ employed for calculation of each set of filter coefficients $w_n$ is determined by the particular Doppler $f_d$ and use of empirical data characterizing the expected skin return and thermal noise (The ground clutter return is rejected by the helicopter filter). The particular signal autocorrelation matrix $Q_s = R_h$ is determined by empirical data gleaned from the spectral characteristics of the radar return signals for the respective $f_D$ values.

Submitted herewith as Appendix A is a computer program listing of a program for computing the filter coefficients in a particular application. Such a program nay be used to calculate the coefficients of the respective filters corresponding to the discrete set of target Dopplers $f_D$ which will be stored in memory as described above. Alternatively, the radar processor may be programmed to implement the computer program on a real time basis, i.e., calculating the filter coefficients during the radar operation.

In operation, the selector 35 receives the $f_D$ value from detector 25, and compares the actual $f_D$ value against the predetermined set of Doppler shift frequencies $f_D$ to determine the particular Doppler $f_D$ of the set which is closest in value to the actual Doppler frequency $f_D$. From this comparison the discrete $f_D$ of the Doppler set is determined, and the filter coefficients which have been precomputed and stored in memory for this discrete $f_D$ value may be retrieved for use.

The helicopter filter 30 comprises a digital filter, implemented by multiplying the respective radar return samples $x_n$ by the corresponding filter coefficient $w_n$, and then summing the products to obtain the complex-valued filter output Y.

The magnitude detector 40 calculates the magnitude of the value Y and compares the resultant magnitude value against the threshold value. If the magnitude of the value Y is below the threshold value, this indicates the "helicopter absent" condition. If the magnitude exceeds the threshold, this indicates the "helicopter present" condition.

Figure 5:
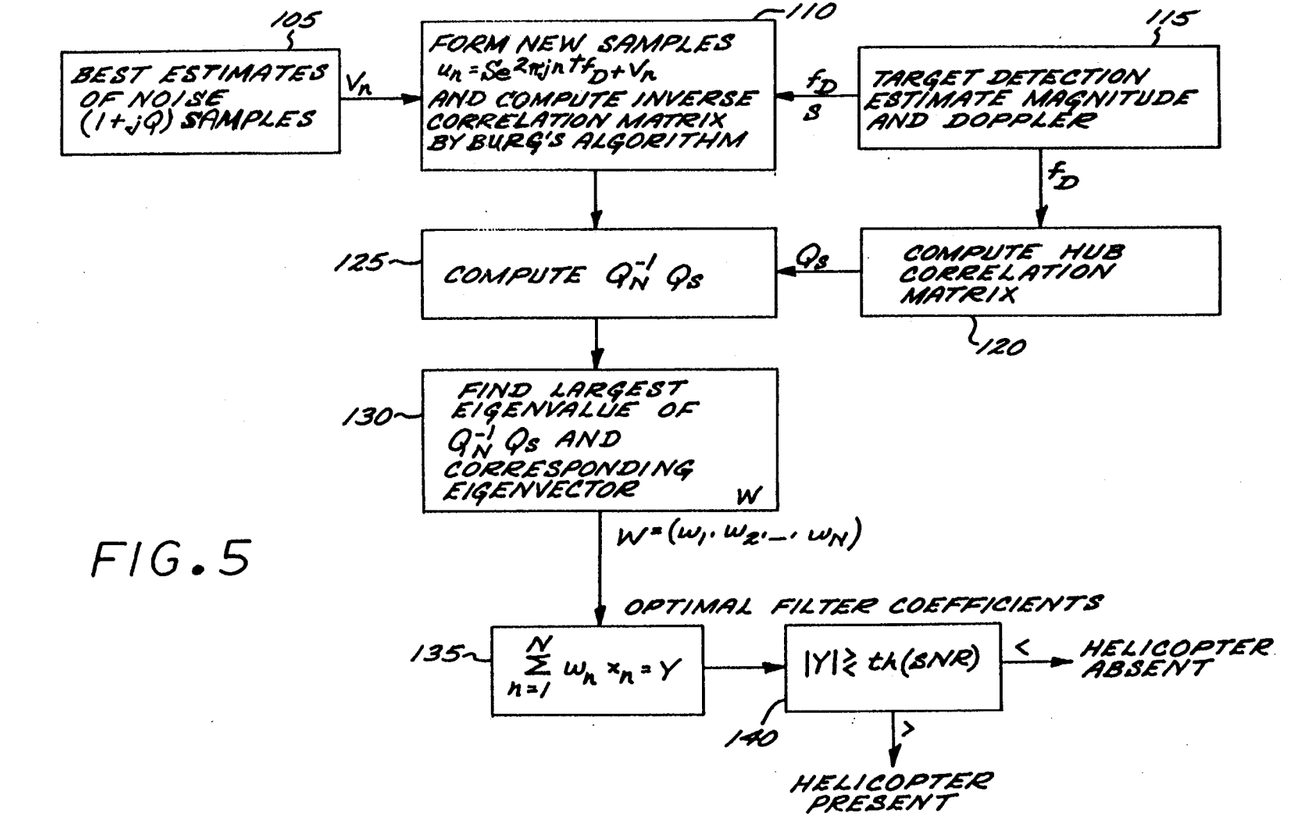
FIG. 5 is a block diagram of a radar processor employing the invention adapted to operation in a generalized noise environment wherein the noise component of the signal may include not only ground clutter but also noise components, such as rain clutter and chaff.

Referring now to FIG. 5, an exemplary signal processing block diagram illustrates the adaptive selection of the helicopter filter coefficients utilizing Burg's algorithm, for a given range-azimuth-elevation cell. This embodiment of the invention is adapted for operation in a generalized noise environment, wherein the noise is of arbitrary characteristics, and may include not only the ground clutter and thermal noise (as well as the target skin return), but also other components of a generalized noise environment, such as rain clutter, moving clutter and chaff. Thus, the embodiment of FIG. 5, while entailing additional processing complexity over the embodiment of FIG. 4, will operate in noisier applications in which the FIG. 4 embodiment, based on its simplistic noise model, would not operate satisfactorily.

Block 115 represents the conventional Doppler filter and detection operations performed on the target radar return samples $x_n$. For this embodiment, these operations not only provide an estimate of the target skin Doppler frequency samples, but also an estimate of the skin return magnitude S. The processing of the radar return samples to obtain an estimate of the skin return magnitude S is well known by those skilled in the art, and is not described in further detail.

Block 105 represents the estimation of the complex valued noise component $v_n$ comprising the radar return samples $x_n$. The noise estimate is obtained by illuminating the particular range-elevation azimuth cell with electromagnetic energy in the absence of a target so that the radar return samples consist entirely of true noise, i.e., the thermal noise, ground clutter, moving clutter, rain clutter, and chaff. This measurement may be periodically repeated to update the noise estimates to the current noise environment. The resultant noise estimates $v_n$ provide a characterization of the noise environment, comprising thermal noise, ground clutter, rain and moving clutter and chaff.

Block 110 represents the formation of the composite "noise" samples $u_n$ (true noise plus the target skin return) and the computation of the inverse noise correlation matrix by Burg's algorithm. This algorithm is described in the Ph.D. dissertation "Maximum Entropy Spectral Analysis," of J. P. Burg, Stanford University, Department of Geophysics, May, 1975.

The new "noise" samples $u_n$ formed in block 110 comprise the noise estimates $v_n$, as well as the target skin return, $$Se^{2\pi jnT}fd. \tag{14}$$

Thus, the "noise" component $u_n$ includes the true noise component $v_n$, representing estimates of the arbitrary noise environment in the absence of any target, and the target skin return, based not only on the target skin Doppler $F_D$ but the magnitude S of the skin return.

Burg's algorithm estimates the inverse correlation matrix $Q_n$ of the noise from the samples $u_n$. The use of Burg's algorithm in Doppler radar signal processing is well known in the art. An exemplary paper illustrating the use of the algorithm in this context is "Adaptive Pulse Doppler Signal Processing Using Maximum Entrophy Method," by James Sawyer, EASCON, 1980 record.

Block 120 represents the computation of the hub correlation matrix $Q_s$ based on the target Doppler $f_D$. In this embodiment the rotor hub correlation matrix $Q_s(=R_h)$ for a particular target Doppler $f_D$ is determined from the target Doppler $f_D$ and the predetermined hub correlation matrix at zero Doppler $Q_{so}$. The matrix $Q_{so}$ is determined from average empirical rotor hub spectrum data at zero Doppler, and by taking the inverse Fourier transform of this average spectral data. The resultant matrix $Q_{so}$ is stored in the radar processor memory for retrieval during operation by the processor.

The rotor hub correlation matrix at zero Doppler $Q_{so}$ is used to determine the rotor hub correlation matrix $Q_s$ for an arbitrary target Doppler $f_D$. Equation 15 provides the general relationship for determining the matrix $Q_s$ comprising k rows and l column of coefficients $$Q_s(k-l) = (e^{2\pi j(k-l)Tf_D})(Q_{so}(k-l)) \tag{15}$$

At block 125, the product of the inverse "noise" autocorrelation matrix $Q_n^{-1}$ and the hub autocorrelation matrix $Q_s$ is computed. This computation is an exercise well known in the field of numerical analysis.

At block 130 the processor determines the largest eigenvalue of the product of the inverse "noise" correlation matrix and the hub correlation matrix, and the corresponding eigenvector W, representing the optimal helicopter filter coefficients $w_n$. While there are many known computational techniques for determining the maximum eigenvalue and the corresponding eigenvector, one well known technique is the Power Method described in the book "The Theory of Matrices in Numerical Analysis," by Alston Householder, Dover Publications, 1964.

Block 135 represents the helicopter digital filter, performing the weighted summation of the $x_n$ samples to calculate the filter output Y.

Block 140 represents the magnitude comparator which compares the magnitude o the filter output with the threshold value to arrive at the appropriate "helicopter present" or "helicopter absent" indication.

Figure 6:
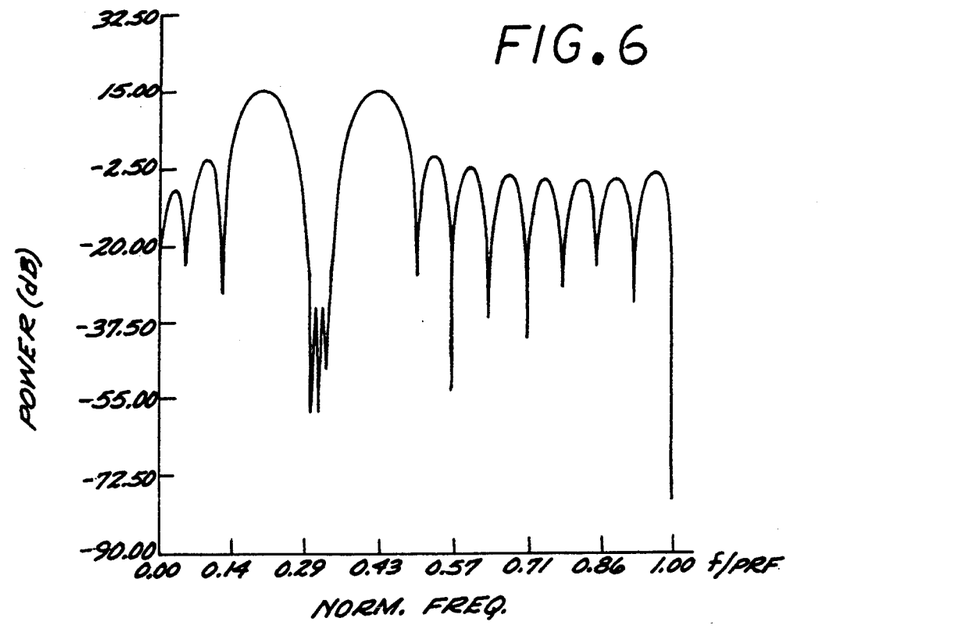
FIG. 6 is a plot of a helicopter filter response characteristic for the case in which radar return samples are collected for 14 pulses, and the target skin Doppler return is at about 0.3 PRF.
Figure 7:
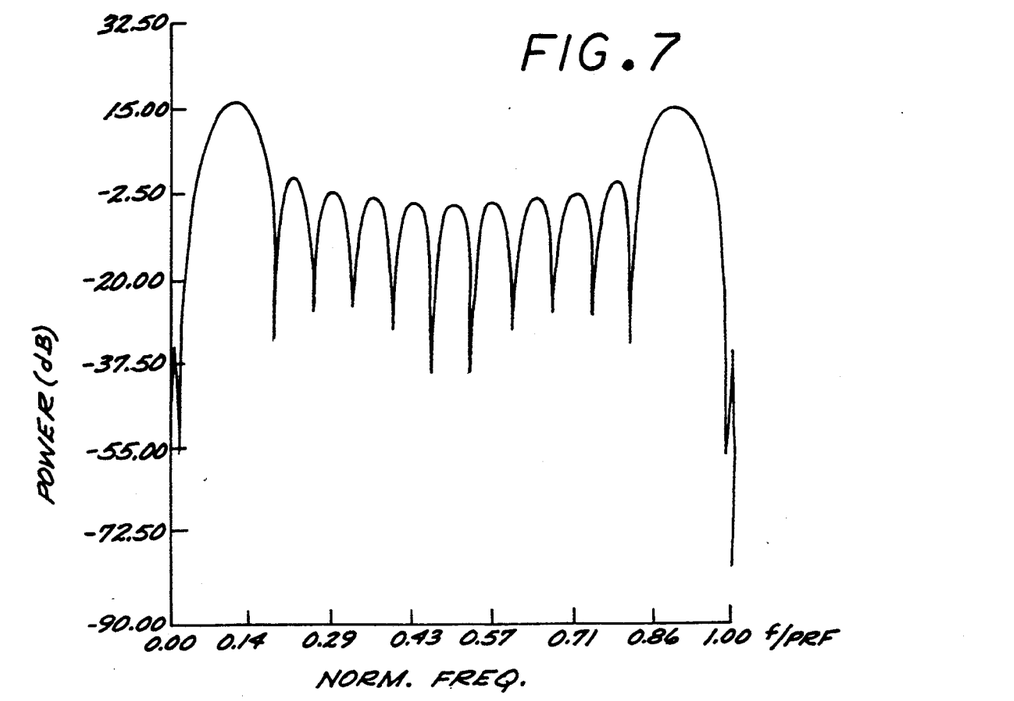
FIG. 7 is a plot of a helicopter filter response characteristic for the case in which radar return samples are collected for 14 pulses, and the target skin Doppler return is about 0.0 PFR (the hovering helicopter case).

Referring now to FIGS. 6 and 7, exemplary helicopter filter responses have been computed and plotted as a function of the normalized frequency (f/PRF). FIG. 6 illustrates the filter response for the case wherein samples are collected for 14 pulses (N=14) and the target skin Doppler $f_D$ is about 0.3 PRF. As FIG. 6 illustrates, the filter response has been designed to substantially eliminate the target skin return and ground clutter, and to pass the power reflected from the helicopter rotor hub.

FIG. 7 illustrates the filter response for the N=14 case and the skin Doppler is about zero, i.e., the hovering helicopter case. This filter characteristic is notched at $f_D=0$ to remove the target skin return and the ground clutter; the filter passes the rotor hub sideband energy centered at $f_D/PRF$ of about 0.10.

A radar processor for discriminating helicopter targets from fixed-wing targets has been disclosed. The processor relies on the spectral signature of the helicopter rotor hub, and is capable of recognizing helicopter targets within relatively short acquisition time. For a typical case wherein the number of return samples which are processed is N=14, and for a radar PRF=10 Mhz, a typical acquisition time is about two milliseconds. Such a short acquisition time makes the processor suitable for implementation as a scanning surveillance radar processor. The helicopter recognition processor may be readily implemented into conventional Doppler radar systems to provide the additional capability of identifying helicopter targets.

It is understood that the above-described embodiments are merely illustrative of the possible specific embodiments which can represent principles of the present invention. Other arrangements may be devised in accordance with these principles by those skilled in the art without departing from the scope of the invention.

APPENDIX A

```
ftn7x
$files 0,3
      program hftr
c ***********************************************************
c *                                                           *
c *   This program calculates the optimal helicopter digital filter *
c *   coefficients for a given clutter scenario.  User must specify *
c *   the following parameters:                                *
c *                                                           *
c *     FD     =  Doppler center of desired filter assuming a PRF of *
c *               10000 Hz. (HERTZ)                            *
c * SWIDTH    =  Width of the null created at FD, main body portion *
c *               of the helicopter return signal is modelled as a *
c *               step centered at FD with width SWIDTH. (HERTZ) *
c *     SN     =  Skin to Thermal Noise Ratio (dB).            *
c *     CN     =  Gaussian Land Clutter to Thermal Noise Ratio (dB). *
c *   SIGC    =  Standard deviation of Gaussian Land Clutter. (HERTZ) *
c *      N    =  Number of coherent pulses to be integrated.  *
c *                                                           *
c *                                                           *
c *   The program prints out the filter coefficients in the output *
c *   file HFILTER.OUT in a format which is suitable for the freq. *
c *   response plotting program FRESP.                         *
c *                                                           *
c *                                              hwb iv        *
c ***********************************************************
c
      complex*16 rs(40,40),rn(40,40),a(40,40),ci,
     . eval,evec(40),rinv(40,40)
      real*8 amax,aval,ipp,tau,phi,pi,theta,factor,hamp,beta,
     . alpha,sn,cn,pn,sigc,fd,swidth
      real*4 wr(40),wi(40)
      ema rs,rn,a,evec,rinv
c
c  Assign constants.
c
      ndim=40
      pi=3.141592654
      pn=10.0
      ci=cmplx(0.0,1.0)
      beta=1.2*alog(10.0)/2000.0
      alpha=0.10/(1.0-exp(-2000.0*beta))
      prf=10000.0
      ipp=1.0/prf
      open(12,file='hftr.in')
      read(12,*) fd,swidth,sn,cn,sigc,nc
      close(12)
      sn=10.0**(sn/10.0)
      cn=10.0**(cn/10.0)
      hamp=alpha*sn*pn*beta**2
c
c  Compute autocorrelation matrices.
c
      do i=1,nc
         do j=1,nc
            tau=float(i-j)*ipp
```

```
              phi=4000.0*pi*tau
              theta=2.0*pi*fd*tau
              factor=(2.0*pi*tau/beta)*sin(phi)-cos(phi)
              factor=1.0+factor*exp(-2000.0*beta)
              rs(i,j)=hamp*factor/(beta**2+(2.0*pi*tau)**2)*cexp(
           ci*theta)
              rn(i,j)=cn*pn*exp(-2.0*(pi*sigc*tau)**2)
              if (i.eq.j) then
                 rn(i,j)=rn(i,j)+pn*(1.0+sn)
              else
                 phi=pi*swidth*tau
                 rn(i,j)=rn(i,j)+pn*sn*sin(phi)/phi*cexp(ci*theta)
              endif
           enddo
        enddo
c
c    Fill in Bottom.
c
        do i=2,nc
           do j=1,i-1
              rs(i,j)=conjg(rs(j,i))
              rn(i,j)=conjg(rn(j,i))
           enddo
        enddo
        open(13,file='dump')
        write(13,*) 'First row of Noise Matrix.'
        write(13,5) (rn(1,j),j=1,nc)
        write(13,*) 'First row of Hub matrix.'
        write(13,5) (rs(1,j),j=1,nc)
c
c    Invert Noise Autocorrelation matrix.
c
        call cdmxiv(rn,nc,er,ndim,rinv)
        write(13,*) 'Inverse of Noise Matrix.'
        write(13,5) (rinv(1,j),j=1,nc)
5       format(5x,f13.5,5x,f13.5)
c
c    Check matrix inverse.
c
        call cdmult(rinv,rn,a,nc,nc,nc,ndim,ndim,ndim)
        write(13,*) 'First 2 rows of RINV*RN'
        write(13,5) ((a(i,j),j=1,nc),i=1,2)
        call cdmult(rn,rinv,a,nc,nc,nc,ndim,ndim,ndim)
        write(13,*) 'First 2 rows of RN*RINV'
        write(13,5) ((a(i,j),j=1,nc),i=1,2)
c
c    Multiply RINV * RS.
c
        call cdmult(rinv,rs,a,nc,nc,nc,ndim,ndim,ndim)
        write(13,*) 'RINV*RS'
        write(13,5) (a(1,j),j=1,nc)
c
c    Find eigenvectors and eigenvalues of A.
c
        close (13)
        call eigvs(a,nc,evec,eval)
        ev=real(eval)
c
c    Normalize Eigenvalues.
c
        amax=0.0
        do j=1,nc
           wtr=real(evec(j))
           wti=imag(evec(j))
```

```
              wtr=abs(wtr)
              wti=abs(wti)
              aval=max(wtr,wti)
              if (aval.gt.amax) amax=aval
           enddo
           do j=1,nc
              wtr=real(evec(j)/amax)
              wti=-imag(evec(j)/amax)
              if (abs(wtr).lt.1.e-5) wtr=0.0
              if (abs(wti).lt.1.e-5) wti=0.0
              wr(j)=wtr
              wi(j)=wti
           enddo
           htnp=10.0*alogt(ev)
           write(1,*) ' N = ',nc
           write(1,*) ' Hub to Noise Power = ',htnp,' dB.'
c
c    Write largest eigenvector to output file.
c
           open(14,file='hftr.out')
           write(14,*) nc
           do i=1,nc
              write(14,114) wr(i),wi(i)
114           format(2x,f8.5,2x,f8.5)
           enddo
           close(14)
           end
c
c    CDMXIV Subroutine.
c
           SUBROUTINE CDMXIV(A,N,E,NAB,B)
c ***************************************************************
c *                                                             *
c *    COMPLEX DOUBLE PRECISION MATRIX INVERSION ROUTINE.       *
c *                                                             *
c *    Subroutine: CDMXIV                                       *
c *                                                             *
c *      USAGE:   call cdmxiv(a,n,e,nab,b)                      *
c *                                                             *
c *          a   - Double precision matrix of dimension nab.    *
c *          n   - Size of matrix within a to invert.           *
c *          e   - Error flag.                                  *
c *        nab   - Dimensioned size of matrix a and b.          *
c *          b   - Matrix to place inverse of a.                *
c *                                                             *
c *                                                             *
c ***************************************************************
           COMPLEX*16 A(NAB,NAB),B(NAB,NAB)
           DIMENSION INT(200)
           EMA A,B
           DO 02 I=1,N
02         INT(I)=0
           NN=N
           E=-1.
           IF ((NN.GT.NAB).OR.(NN.LE.0).OR.(NN.GT.200)) GO TO 1
           CALL ECDDCOM (A,INT,NAB,NN,B)
           CALL ECDINVR (B,INT,NAB,NN,B)
           E=0.
           IF (INT(NN).EQ.0) E=1.
1          RETURN
           END
c
c    DOUBLE PRECISION COMPLEX MATRIX DECOMPOSITION
c
```

```
      SUBROUTINE ECDDCOM (B,INTR,MSIZE,NN,A)
      DIMENSION INTR(MSIZE)
      COMPLEX*16 AT,AMAX,A(MSIZE,MSIZE),B(MSIZE,MSIZE)
      REAL*8 AMAX1,AT1
      EMA A,B
C     IF MATRIX A IS SINGULAR INTR(N) WILL BE SET TO ZERO
      N=NN
      IF (0.LT.N) GO TO 17
      RETURN
17    IF (1.LT.N) GO TO 15
      IF( (REAL(B(1,1)).EQ.(0D0)).AND.(IMAG(B(1,1)).EQ.0D0)) GO TO 11
14    INTR(1) = 1
      A(1,1)=B(1,1)
      RETURN
15    CONTINUE
      DO 20 I=1,N
      DO 20 J=1,N
20    A(I,J)=B(I,J)
19    NTR=1
      NM=N-1
      DO 10 J=1,NM
      AMAX1=ABS((A(J,J)))
      JP=J+1
      IN=0
      DO 2 I=JP,N
      AT1  =ABS(A(I,J))
      IF( AMAX1.GE.AT1) GO TO 2
1     AMAX1=AT1
      IN=I
2     CONTINUE
      IF(AMAX1.NE.0D0)GO TO 4
3     INTR(J)=J
      GO TO 11
4     IF(IN)5,7,5
5     NTR=-NTR
      DO 6 I=J,N
      AT=A(J,I)
      A(J,I)=A(IN,I)
6     A(IN,I)=AT
7     INTR(J)=IN
      AMAX=-1D0/A(J,J)
      DO 10 I=JP,N
      IF( (REAL(A(I,J)).EQ.0.).AND.(IMAG(A(I,J)).EQ.0.0)) GO TO 10
8     AT=A(I,J)*AMAX
      A(I,J)=AT
      DO 9 K=JP,N
9     A(I,K)=A(J,K)*AT+A(I,K)
10    CONTINUE
      IF( (REAL(A(N,N)).NE.0.).OR .(IMAG(A(N,N)).NE.0.0)) GO TO 12
11    NTR=0
12    INTR(N)=NTR
      RETURN
      END
C
C
C         ECDINVR -DOUBLE PRECISION COMPLEX MATRIX INVERSION
C
      SUBROUTINE ECDINVR(B,INTR,MSIZE,NN,A)
      DIMENSION INTR(MSIZE)
      COMPLEX*16  A(MSIZE,MSIZE),B(MSIZE,MSIZE),X
      REAL*8   XD(2)
      EMA A,B
      EQUIVALENCE(X,XD)
C     OBTAINS EXPLICIT INVERSE OF DECOMPOSED MATRIX
```

```
C       SUBROUTINE CDDCOM MUST BE CALLED FIRST
        N=NN
        IF(INTR(N))18,17,18
1       DO 13 K=1,N
        KM=K-1
        IF(KM)2,7,2
2       IF(K-N)3,7,3
C       COMPLETE REDUCTION BELOW DIAGONAL
3       KP=K+1
        DO 6 I=KP,N
        X=A(I,K)
        IF ((XD(1).EQ.0D0).AND.(XD(2).EQ.0D0)) GO TO 6
4       DO 5 J=1,KM
5       A(I,J)=A(K,J)*X+A(I,J)
6       CONTINUE
C       DIVIDE THROUGH BY PIVOT ELEMENT
7       X=1D0/A(K,K)
        A(K,K)=1D0
        DO 8 J=1,N
8       A(K,J)=A(K,J)*X
        IF(KM)9,13,9
C       REDUCE TERMS ABOVE DIAGONAL
9       DO 12 I=1,KM
        X=-A(I,K)
        IF ((XD(1).EQ.0D0).AND.(XD(2).EQ.0D0)) GO TO 12
10      A(I,K)=0.0
        DO 11 J=1,N
11      A(I,J)=A(K,J)*X+A(I,J)
12      CONTINUE
13      CONTINUE
C       INTERCHANGE COLUMNS
C       KM=N-1 FROM PREVIOUS LOOP
        DO 16 J=1,KM
        K=N-J
        KP=INTR(K)
        IF(KP)14,16,14
14      DO 15 I=1,N
        X=A(I,KP)
        A(I,KP)=A(I,K)
15      A(I,K)=X
16      CONTINUE
17      RETURN
18      IF (N-2) 180,185,185
180     A(1,1)=1D0/B(1,1)
        RETURN
185     CONTINUE
C       DO 186 I=1,N
C       DO 186 J=1,N
C186    A(I,J)=B(I,J)
189     KM=N-1
        IF (KM-2) 1,190,190
190     DO 21 I=2,KM
        K=INTR(I)
        IF(K)19,21,19
19      KP=I-1
        DO 20 J=1,KP
        X=A(I,J)
        A(I,J)=A(K,J)
20      A(K,J)=X
21      CONTINUE
        GO TO 1
        END
C
C       CDMULT Subroutine.
C
```

```
      subroutine cdmult(a,b,c,l,m,n,nra,nrb,nrc)
c ***********************************************************************
c *                                                                     *
c *           COMPLEX DOUBLE PRECISION MATRIX MULTIPLICATION            *
c *                                                                     *
c *           USAGE: CALL CDMULT(A,B,C,L,M,N,NRA,NRB,NRC)               *
c *                                                                     *
c *     where:                                                          *
c *                                                                     *
c *                   A(L,M)*B(M,N)=C(L,N)                              *
c *                                                                     *
c *           NRA = Number of dimensioned rows matrix A.                *
c *           NRB = Number of dimensioned rows matrix B.                *
c *           NRC = Number of dimensioned rows matrix C.                *
c *                                                                     *
c *   NOTE:   The matrices A, B and C may be dimensioned larger         *
c *           than necessary.  Only the first LxM elements of array     *
c *           A are used.  Only the first MxN elements of array         *
c *           B are used.  Only the first LxN elements of array         *
c *           C are used.                                               *
c *                                                                     *
c *                                                            hwb iv   *
c *                                                                     *
c ***********************************************************************
c
      complex*16 a(nra,1),b(nrb,1),c(nrc,1),tot
      ema a,b,c
      do i=1,l
         do j=1,n
            tot=cmplx(0d0,0d0)
            do k=1,m
               tot=tot+a(i,k)*b(k,j)
            enddo
            c(i,j)=tot
         enddo
      enddo
      return
      end
c
c  EIGVS Subroutine
c
      subroutine eigvs(a,nc,y,eval)
c ***********************************************************************
c *                                                                     *
c *     COMPLEX DOUBLE PRECISION PRINCIPAL EIGENVALUE/EIGENVECTOR       *
c *                         SUBROUTINE                                  *
c *                                                                     *
c *                                                                     *
c *   THIS SUBROUTINE FINDS THE EIGENVECTOR CORRESPONDING TO THE        *
c *   LARGEST EIGENVALUE OF THE MATRIX A.                               *
c *                                                            hwb iv   *
c ***********************************************************************
      complex*16 a(40,40),y(40),eval,sum,x(40)
      real*8 norm,dif,tot,tol
      ema a,y,x
c
c  Initialize Multiplication Vector.
c
      do i=1,nc
         y(i)=cmplx(1.0,0.0)
      enddo
      dif=1.0
      iter=0
      tol=1.e-35
```

```
c   Start Iteration.
c
        do while (dif.gt.tol)
          *iter=iter+1
            do i=1,nc
                x(i)=y(i)
            enddo
            do i=1,nc
                sum=(0.0,0.0)
                do j=1,nc
                    sum=sum+a(i,j)*x(j)
                enddo
                y(i)=sum
            enddo
c
c   Calculate Norm of Vector Y.
c           tot=0d0
            do i=1,nc
                tot=tot+abs(y(i))**2
            enddo
            norm=sqrt(tot)
            eval=cmplx(norm,0d0)
            dif=0d0
            do i=1,nc
                y(i)=y(i)/norm
                dif=dif+abs(x(i)-y(i))**2
            enddo
            if (iter.gt.500) then
                write(1,*) ' *** EIGVS NOT CONVERGING *** '
                write(1,*) ' Eval=',eval
                write(1,*) ' Dif = ',dif
                goto 100
            endif
        enddo
100     write(1,*) ' Number of Iterations = ',iter
        return
        end
```

What is claimed is:

1. A Doppler radar system for recognizing helicopter targets from fixed-wing targets, comprising:

a radar receiver responsive to radar return signals for providing receiver output signals;

Doppler filter means for filtering coupled to receive said receiver output signals for filtering said receiver output signals to provide Doppler-filtered receiver signals;

detector means coupled to receive said Doppler-filtered receiver signals for providing target Doppler signals;

filter means coupled to receive said receiver output signals, said filter means being adaptable to apply complex weighting coefficients to said receiver output signals to provide a complex-valued filter output;

filter selector means coupled to receive said target Doppler signals, said filter selector means providing complex weighting coefficients to said filter means, the values of said complex weighting coefficients being determined by the frequency of said target Doppler signals; and means for comparing said complex-valued filter output with a threshold value which is indicative of the presence of a helicopter.

2. The radar system of claim 1 wherein said filter selector means provides complex weighting to said filter means to provide a frequency response of said filter means that is relatively low near the frequency of the target Doppler signals and relatively high for frequencies in the frequency range of the rotor hub of a helicopter target.

3. The radar system of claim 1 wherein said filter selector means provides complex weighting to said filter means to provide a frequency response of said filter means that is relatively low near the frequency of the target Doppler signals and relatively high for frequencies in the frequency range of approximately 2000 Hz above and 2000 Hz below the frequency of the target Doppler signals.

4. The radar system of claim 1 further comprising:

means for estimating noise in the radar operating environment, said means for estimating noise being coupled to receive radar return signals in the absence of a target, said means for estimating providing an estimated noise signal;

means for providing composite signals from said estimated noise signals and said target Doppler signals;

said filter selector means further including means to computer a correlation matrix to determine said complex weighting coefficients for an arbitrary target Doppler signal;

means for computing the product of complex weighting coefficients and said composite signals to provide resultant signals; means for computing the optimal filter coefficients from said resultant signals, said optimal filter coefficients being coupled to said filter means.

* * * * *